United States Patent Office 3,637,539
Patented Jan. 25, 1972

3,637,539
POLYURETHANES PREPARED FROM GLYCERIDE
REACTION PRODUCTS
Per Wolff, Farum, and Hans-Ole Larsen, Bagsvaerd,
Denmark, assignors to Per Wolff and Henning Kaaber,
Farum, Denmark, and H. C. Anderson, Bellavista, Switzerland
No Drawing. Filed Oct. 4, 1968, Ser. No. 765,027
Claims priority, application Great Britain, Oct. 12, 1967,
46,671/67; Feb. 20, 1968, 8,268/68
Int. Cl. C08c 17/08; C08d 13/08; C08f 47/10
U.S. Cl. 260—2.5
5 Claims

ABSTRACT OF THE DISCLOSURE

A new group of polyurethanes are described and claimed together with methods for their production, the said polyurethanes being the reaction products of a polyisocyanate with a polyol component, of which latter a substantial part is a reaction mixture of hydrocarbon fatty acid glyceride with dialkanolamine, in which at least about half of the fatty acid has been converted into alkanolamide.

The present invention relates to reaction products of dialkanolamines and fatty acid glycerides and to polyurethane materials derived from them.

Polyurethanes are formed by reaction between a polyisocyanate and polyhydroxyl component subsequently referred to as polyols.

The polyhydroxyl compounds conventionally used for the production of polyurethanes can be classified as polyesters or polyethers.

The polyesters are prepared from polyfunctional alcohols, such as ethylene glycol, diethylene glycol, trimethylol propane, butylene glycol, and glycerol, and polyfunctional organic acids, such as adipic acid and phthalic acid. The molecules contain a plurality of ester linkages and terminal hydroxyl groups.

The polyethers are prepared from a small polyfunctional alcohol, such as glycerol, trimethylol propane, 1,2,6 hexanetriol, pentaerythritol, sorbitol, or sucrose, which is treated with propylene oxide or ethylene oxide to give a more or less branched molecule in which the branches contain a plurality of ether linkages and a hydroxyl group.

The polyurethanes of the present invention may be used for a variety of purposes such as coatings, adhesives, elastomers and foams, but are particularly useful in the production of rigid polyurethane foam. The physical characteristics and mechanical properties of polyurethanes are primarily dependent upon the structure, molecular size and functionality of the polyhydroxy compound. Flexible foams should not be too highly crosslinked and are thus usually prepared from polyols with a functionality of between two and three, whereas a high degree of cross-linking is generally thought to be necessary in rigid foams, which are, therefore, normally prepared from polyhydroxy compounds with a functionality of at least three.

The polyesters and the polyethers are purely synthetic materials. Their production is dependent on an ample supply of bulk chemicals from the petrochemical industry, and their price and availability are linked to the production capacity for such chemicals. Their production further demands large and complicated apparatus and much technical skill, limiting the number of suppliers to the few very big chemical companies.

Thes and other considerations have made it desirable to find a new class of polyhydroxy compounds suitable for production of polyurethanes, and particularly polyhydroxy compounds which could be prepared from cheap raw materials available in ample quantities all over the world, and which could be prepared by a very simple and cheap process making use of simple apparatus and demanding no special techniques or highly trained personnel.

An object of the present invention is therefore to provide a new class of polyurethanes, based on polyols prepared from glycerides, and more specifically from the various natural fats and oils, which are cheap and available in enormous quantities in most parts of the world, and which can be converted into raw materials useful in the field of polyurethane by a simple process.

It has previously been proposed to subject fish oil to a re-esterification process with alcohols containing two or more hydroxyl groups, including aminoalcohols, and to react the resulting mixture of fatty acid esters, e.g. aminoalcoholalkyl esters, and glycerol, with a diisocyanate. Aminoalcohols specifically proposed are tertiary aminoalcohols such as triethanolamine, which compounds do not permit amide formation.

It has further been proposed to prepare urethane foams from castor oil and castor-based polyols. Castor oil itself is known to produce very rigid foams.

The ability of castor-based polyols to give urethane foams is, however, due to the hydroxy group attached to the carbon chain of the ricinoleic acid groups of the castor oil, the said hydroxyl group forming a cross-linking site, and caster oil, being in great demand for other purposes, is a rather costly raw material.

The present invention is based upon the discovery that polyhydroxy compounds which can be produced cheaply from glycerides, such as natural fats and oils, are suitable for use in the production of polyurethanes and, in particular surprisingly useful in producing rigid polyurethane foams.

Accordingly the invention comprises a new group of polyurethanes of the kind being reaction products of a polyisocyanate with a polyol component, the said polyurethanes being characterized in that a substantial part of the polyol component is a reaction mixture of hydrocarbon fatty acid glyceride and dialkanolamine, in which at least about half of the fatty acid has been converted into dialkanolamide.

A particular advantage of the new polyurethanes resides in that the preparation of the dialkanolamide-containing polyol component is very simple, since it generally comprises only heating a mixture of the glyceride and the dialkanolamine to a temperature between 80° C. and 200° C. for a short period. A simple test of checking that the reaction has proceeded to a satisfactory extent consists in mixing a sample of the reaction mixture with an equal amount of the polyisocyanate to be used in the polyurethane process, e.g. on a glass plate. If the mixture is inhomogeneous and separates in phases, the reaction should be continued. If the mixture is, or after a short time becomes substantially homogeneous, the reaction mixture is suitable for the present purpose.

Particularly preferred polyurethanes of the present invention are those, in which the polyol component contains the reaction product of naturally occurring fats or oils and dialkanolamine, and more particularly those, in which the dialkanolamine is diethanolamine, owing to the cheapness and availability of these raw materials.

In a preferred embodiment of the present invention, the polyurethanes are in the form of rigid foam. It is surprising, and particularly advantageous, that rigid foams of good quality can be prepared from the polyol components of low functionality combined with relatively low hydroxyl number, which are used for the polyurethanes of the invention, since this makes for a low ratio of the more costly diisocyanate to polyol, so that the rigid polyurethane foams of the invention can compete economically with other types of rigid foams.

The invention further comprises a process for preparing the present polyurethanes, which is characterized in a fatty acid dialkanolamide containing polyhydroxy component being prepared by heating hydrocarbon fatty acid glycerides with at least a substantially equivalent amount of dialkanolamine, the heating to be continued at least until the reaction product gives a clear mixture with toluene diisocyanate, the said polyhydroxy component, with or without a further admixture of a polyol or polyols being reacted with the polyisocyanate component.

The ratio of dialkanolamine to fatty acid radicals can be varied between 0.75 and 2.0. A preferred range is 0.8 to 1.6.

The advantage of the said process is on one hand that the reaction mixture of glyceride and dialkanolamine can be used as such without any need of separating any component of the mixture, and on the other hand that the reaction proceeds very rapidly to a point, where the mixture is satisfying for polyurethane formation, and that this can be determined by the simple test of mixing a sample with toluene diisocyanate to determine if the mixture is homogeneous. In fact, it is generally preferred not to proceed with the reaction after the test shows homogeneity, since side reactions may then set in, involving the hydroxyl groups which are necessary for the reaction with the polyisocyanate.

One such side reaction is the disproportionation of two moles of dialkanolamide into one mole of dialkanolamine and one mole of amidoester in which one fatty acid radical has replaced the hydrogen in one of the hydroxyl groups of the dialkanolamide.

Other side reactions particularly at a higher temperature (above 180° C.) are the splitting-off of water from two moles of dialkanolamine, forming among other compounds substituted piperazines, and the formation of acrolein from glycerol. These side reactions will manifest themselves as increase in hydroxyl equivalent weight, and it is preferred that the hydroxy equivalent weight is kept below twice the value reached when the reaction mixture was first clear with TDI. Too high hydroxyl equivalent weight may be remedied by further heating at lower temperature and adding low molecular weight hydroxyl compound.

It appears, as is illustrated by the examples, that the maximum amount of amide is obtained close to the point where the reaction product first gives a clear mixture with isocyanate, and the formation of byproducts then takes place at an increased rate as the heating is continued.

In order to determine whether a reaction mixture of dialkanolamine and fatty acid glyceride is suitable for the purpose of the present invention, in practice we simply determine the hydroxyl equivalent value of the sample, adjust by addition of glycerol to a value of 115 and prepare a foam using the following standard formulation:

| | Parts |
|---|---|
| Polyol (adjusted mixture) | 100 |
| Dimethylcocos amine, Armour Chemicals | 1.5 |
| Silicone surfactant | 0.5 |
| Freon | 28 |
| Methylene bis (4-phenyl isocyanate) | 130 |

A reaction mixture, which results in heavy shrinkage of the polyurethane foam, has been reacted for too long a time and can often be improved by subsequent heating at a lower temperature, e.g. 80–100° C.

If, according to the invention, a blowing agent is present during the reaction with the isocyanate, a rigid polyurethane foam is obtained. This is indeed surprising since the functionality of the reaction mixture will usually be between two and three, the dialkanolamide of the mixture having two hydroxyl groups, and the liberated glycerol having three hydroxyl groups per molecule. It is supposed, but it is not certain, that the reason for the high degree of dimensional stability that can be achieved in such foams in spite of the low average functionality of the polyhydric component, is that the polyurethanes from the dialkanolamide polyols have a higher "glass transition temperature" (i.e. the temperature at which a polymer changes from a hard brittle state to a tough rubbery state), than the usual polyurethanes. The structures, one can visualize for such foams, will be very densely crosslinked areas surrounded by a "cloud" of hydrocarbon chains from the fatty acid, these hydrocarbon chains being attached to the cross-linked areas via the very polar amide group. The hydrocarbon chains are thus isolated from the polar parts of the polymer, and any kind of a plasticizing action from the hydrocarbon is thus reduced. The amide group itself gives a very high melting temperature. Also the possibility of an ordered arrangement of the hydrocarbon chains within the "cloud" is favoured, which should also lead to a higher glass transition temperature.

An advantage of the rigid polyurethane foams of the present invention is that they are unusually tough with a high resistance towards impact and vibrational fatigue. This is very important in structural applications, such as moulded shells in furniture. In the performance tests proposed by the British Furniture Industry Research Association for shell chairs moulded with rigid polyurethane foams, the rigid polyurethane of the present invention shows great advantages over the conventional polyurethanes moulded from polyether or polyester polyols. For example, in one test a load is applied at right angles to the surface of the chair back 4" down from the top of the back. The chair is prevented from tipping backwards by a downward vertical force of 224 lbs. The back load is applied repeatedly at about 40 cycles a minute.

A chair moulded from a conventional polyether polyol system designed for structural application failed after 65,000 applications of 85 lbs. load. The same chair moulded to the same density from a polyurethane foam of the present invention passed 150,000 load applications without any sign of failure.

In a preferred embodiment of the present process, the fatty acid glyceride is a naturally occurring fat or oil in which the fatty acid contains 6 to 24 carbon atoms. Examples of such are lard, bone grease, peanut oil, sesame oil, sunflower seed oil, olive oil, palm oil, coconut oil, corn oil, cottonseed oil, rapeseed oil, linseed oil, soybean oil, tung oil, and fish oils.

Polymerized drying or semidrying oils can also be used, such as blown linseed oil, linseed stand oils, blown soybean oils, and heat-bodied sunflower oils. Tough rigid polyurethane foams, having a high load bearing capacity and improved properties at higher temperatures, can be prepared from polyol components consisting of the reaction product of such polymerized oils and dialkanolamines.

The technical grade of naturally occurring fats and oil usually contains a significant portion of free fatty acid. This does not decrease the utility in the present process, and it is possible and often advantageous to add further fatty acid to the glyceride which is used in the present process.

The dialkanolamines to be used in the present process are preferably short chain alkanolamines, containing two to six carbon atoms in the alkanol group, the preferred one being diethanolamine, owing to its cheapness and availability. Other dialkanolamines, such as diisopropanolamine, dipropanolamine, and dibutanolamine, however, are equally useful in the present process.

As formerly stated, the dialkanolamide-containing polyol component may have another polyol or polyols admixed, which according to the invention can be an ammonium soap of a dialkanolamine and fatty acid.

Thus, in an embodiment of the present process, the fatty acid glyceride is reacted with a substantial surplus of dialkanolamine, the surplus of amine in the reaction mixture being at least partially neutralized by admixing fatty acid before the polyurethane formation.

Since the dialkanolamide formation in the reaction product of glyceride and dialkanolamine to be used as a polyol component need not be, and in fact usually is not carried to completion, a surplus of amine will usually be present, and could be neutralized with added fatty acid to form the ammonium soap. Fatty acids are obtained as secondary products in various manufactures, and are thus often cheap raw materials. Their advantage for use in neutralizing excess of dialkanolamine, which in itself is a polyol capable of reacting with a polyisocyanate, is to further reduce the polyisocyanate to polyol ratio, thus saving some of the more costly polyisocyanate.

Other preferred polyols, which can be used admixed with the dialkanolamide-containing reaction mixture, are ethylene glycol, propylene glycol, and other low molecular weight dihydroxy compounds. The fact that rigid foams with good mechanical properties can be made from such mixtures further illustrates the unique ability of the dialkanolamide-containing reaction mixture to give rigid foams in spite of an unusually low average functionality of the polyol component.

In the production of the polyurethanes and rigid foams thereof, any of the commercially available polyisocyanates may be used, such as toluene diisocyanate, methylene bis (4-phenyl isocyanate) and polymethylene polyphenyl isocyanate, together with the usual catalysts, blowing agents and silicone surfactants.

An advantage of the dialkanolamide-containing polyol components used for the polyurethanes of the present invention is that in many cases they can give polyurethane foams with very fine cell structure (20–150$\mu$ as compared to the usual 100–500$\mu$) without use of the expensive silicone surfactants which are necessary as cell regulators in conventional polyols.

Another advantage of the dialkanolamide-containing polyols is that the viscosity of these polyols is generally much lower than the viscosity of the conventional polyols. Whereas conventional polyols for rigid foam have viscosities between 10,000 and 250,000 centipoises, the dialkanolamide-containing polyols can have viscosities as low as 1,200 centipoises. This makes handling, mixing with isocyanate, and pouring or spraying of the mixture much simpler.

An unusual and advantageous property of the dialkanolamide-containing components used for the polyurethanes of the present invention is that, on account of the combination of the non-polar fatty acid chain and the strongly polar dialkanolamide group, they are compatible with a broad range of both polar and non-polar substances.

For instance, they can be mixed with and blown by means of the cheap petrol ether generally referred to as petroleum ether. This blowing agent, either alone or mixed with Freons, is a preferred blowing agent which, apart from economical advantages, also gives very good control of the expansion of the polyurethane foam during moulding operations.

Another advantage is that said polyol components are compatible with non-polar mineral oils and tars, which may function as very cheap extenders.

A further advantage is that said polyol components are compatible with the polar polyether polyols and can be used in combination with them.

Said polyol components are also compatible with many polar and non-polar polymers.

Amide and ester contents of the polyols are determined by infrared analysis, using 5% solutions in chloroform. The amide (including any amidoester) is calculated from the peak at 1625 cm.$^{-1}$, using a sample of pure N,N-bis-(2-hydroxyethyl) stearic amide as standard.

The aminoester contents (including any amidoester) is calculated from the peak at approximately 1725 cm.$^{-1}$, using a sample with known contents of 2-(2-hydroxy-ethyl-amino)ethyl stearate.

Hydroxyl values are determined by the ASTM phthalic anhydride method. In the examples, this value is recalculated and expressed as "hydroxyl equivalent weight." These "hydroxyl equivalent weights" stem from hydroxyl groups as well as from reactive amino groups, as both will react with the isocyanate.

The following examples, in which parts are by weight, are illustrative of the manufacture of the polyurethanes of the invention and rigid foams produced therefrom.

EXAMPLE 1

A mixture of soybean oil (saponification value 193, acid value 0.5, iodine value 135) (600 grams) and diethanolamine (224 grams) is heated with stirring to 170° C.

The progress of the reaction is followed by withdrawing samples which are mixed with toluene diisocyanate (TDI). (A convenient method of performing this test is to dissolve 10 drops of sample in 3 ml. of methyl ethylketone and then add 3 drops of TDI.)

The reaction is continued for 5 hours.

The following results are obtained:

| Polyol sample No. | Reaction time, min. at 170° | TDI test | Meq./g. Amide | Meq./g. Ester | Meq./g. Amine | Free acid | OH plus (NH) Meq./g. | OH plus (NH) Mg. KOH/g. | OH plus (NH) Eq.w. | Percent amide formation |
|---|---|---|---|---|---|---|---|---|---|---|
| 1 | 0 | − | 1.22 | 1.26 | 1.32 | 0.02 | 7.62 | 428 | 131 | 47 |
| 2 | 30 | + | 1.62 | 0.85 | 0.92 | 0.03 | 7.51 | 422 | 133 | 63 |
| 3 | 60 | + | 1.72 | 0.74 | 0.82 | 0.04 | 7.43 | 416 | 135 | 67 |
| 4 | 90 | + | 1.64 | 0.80 | 0.90 | 0.06 | 7.15 | 401 | 138 | 64 |
| 5 | 120 | + | 1.67 | 0.75 | 0.87 | 0.08 | 6.98 | 391 | 143 | 65 |
| 6 | 150 | + | 1.62 | 0.80 | 0.92 | 0.08 | 6.71 | 377 | 149 | 63 |
| 7 | 180 | + | 1.54 | 0.86 | 1.00 | 0.10 | 6.59 | 370 | 152 | 60 |
| 8 | 210 | + | 1.51 | 0.88 | 1.03 | 0.10 | 6.46 | 362 | 155 | 59 |
| 9 | 240 | + | 1.45 | 0.95 | 1.09 | 0.10 | 6.20 | 348 | 161 | 56 |
| 10 | 270 | + | 1.40 | 0.99 | 1.14 | 0.11 | 6.17 | 346 | 162 | 54 |
| 11 | 300 | + | 1.34 | 1.05 | 1.20 | 0.11 | 5.85 | 328 | 171 | 52 |

Polyurethanes foams are prepared using the following formulation:

Reaction product _____ 35
Water _____ 0.3
Silicone surfactant _____ 0.1
DMCD (Dimethylcocus amine, Armour Chemicals) _ 0.5
Petrol ether (B.P. below 50° C.) _____ 3.8
PAPI _____ 41.5 the figures representing parts by weight.

Properties of foams:

| Polyol No. | Average shrinkage, vol. percent | Average compressive strength, kg./cm.² at 40 kg. per m.³ | Remarks |
|---|---|---|---|
| 1 | | | Very inhomogeneous. High shrinkage. |
| 2–4 | 2.2 | 2.1 | Homogeneous. Cell size 20 to 60 $\mu$. |
| 5–6 | 4.1 | 1.9 | |
| 7–9 | 7.2 | 1.8 | |
| 10–11 | 18.3 | 1.5 | |

EXAMPLE 2

Non-edible lard (300 grams), diethanolamine (112 grams), and di-tert. butyl phenol (an antioxidant) (2.0 grams) are heated in a beaker at 150° C.

The reaction mixture becomes homogeneous after 90 minutes. A sample withdrawn at this state gives an inhomogeneous reaction product when mixed with toluene diisocyanate (TDI). After further reaction for one hour, a sample gives a homogeneous reaction product with TDI, and a sample is withdrawn for preparation of a polyurethane foam according to the following formulation:

|  | G. |
| --- | --- |
| Reaction product | 67.0 |
| Silicone surfactant | 1.0 |
| Freon 11 | 10.0 |
| Polymeric phenylmethane isocyanate | 70.0 |

The resulting foam is rigid with a very small cell size of 35–50$\mu$, and the free rise density is 39 g./litre with a compressive strength of 1.1 kg./cm.$^2$.

EXAMPLE 3

Glycerol tristearate (Technical Tristearin, Unilever-Emery N.V.), (628 parts) and diethanolamine (231 parts) are heated under stirring to 130° C., and 4 parts of sodium methoxide are then added. After 5 hours at 130° C., a sample remains clear when mixed with TDI, following the procedure of Example 1. The reaction mixture is cooled down to 25° C., and solidifies. (OH eq. w.: 130. Amide contents 2.12 meq./g.). The polyol is mixed with an equal amount of a polyol prepared from soybean oil, and polyurethane foam is prepared from the mixture, according to the recipe of Example 2.

The polyurethane foam is rigid and tough with an unusually even and fine cell structure having an average cell size of 60$\mu$.

EXAMPLE 4

A mixture of blown linseed oil (600 g.) and diethanolamine (231 g.) is heated to 130° C., and sodium methoxide (4 g.) is added. After 3.5 hours, a sample gives a homogeneous mixture with TDI. The polyol has an OH equivalent weight of 137.

Reaction product (65.6 parts), silicone surfactant (0.6 part), water (0.5 part), Armeen DMCR (0.5 part), petrol ether (7.6 parts), and PAPI polyisocyanate (82 parts) gives a homogeneous rigid foam with zero shrinkage and a compressive strength of 2.65 kg./cm.$^2$ at a density of 44 kg./m.$^3$.

EXAMPLE 5

A mixture of blown linseed oil (300 parts) and diethanolamine (114 parts) is heated under stirring to 200° C.

During the reaction, samples are withdrawn. After 30 minutes at 200° C., the sample remains clear when mixed with TDI, but is still turbid with MDI. After 2 hours at 200° C., the sample will produce a clear mixture with both TDI and MDI. The reaction mixture is heated for another 16 hours and then cooled.

Polyurethane foams are prepared from the various samples according to the following recipe:

|  | Parts |
| --- | --- |
| Reaction product | 67 |
| Dibutyltin dimaleate | 0.1 |
| Silicone surfactant | 1 |
| Freon 11 (trichlorofluoro methane) | 10 |
| PAPI (proprietary name for a mixed aromatic polyisocyanate produced by the Upjohn Company) | 70 |

The results can be summarized as follows:

TABLE 1
Influence of reaction time upon foam quality

| Sample | Reaction time, minutes at 200° C. | Sample mixed with— | | Properties of resulting foam |
| --- | --- | --- | --- | --- |
| | | TDI | MDI | |
| A | 15 | Clear | Turbid | Rigid, tough foam with very small cells. No shrinkage at all. |
| B | 40 | do | (Turbid) | Do. |
| C | 105 | do | Clear | Rigid, tough foam. Slight tendency to shrinkage. |
| D | 220 | do | do | Semiflexible foam. Heavy shrinkage. |
| E | 1,080 | do | do | Fast reaction with PAPI, but the reaction product remains liquid. |

EXAMPLE 6

Tung oil (300 parts) and diethanolamine (112 parts) are reacted at 175° C. for 60 minutes. A sample gives only a slight turbidity when mixed with MDI. Foam prepared from this sample is of excellent quality.

After further four hours, another sample is tested, giving a foam of good quality and showing a shrinkage of 3–5%.

After another hour at 175° C., foam prepared from the mixture tends to shrink, and the experiment is stopped.

EXAMPLE 7

300 parts of peanut oil are mixed with 138 parts of diisopropanolamine, heated to 170° C. for 3 hours, and then cooled.

The reaction product (72 parts) is mixed with dibutyltin dimaleate (0.1 part), a silicone surfactant (1.0 part), petrol ether (10 parts), and PAPI (70 parts). A rigid polyurethane foam with good mechanical properties is obtained.

EXAMPLE 8

Bone grease (575 g.) (saponification value 198, acid value 65) and diethanolamine (215 g.) are reacted at a temperature of 175° C.

The reaction mixture becomes homogeneous after 70 minutes. After 90 minutes, a homogeneous reaction product is obtained when a sample is mixed with polyisocyanate. The reaction mixture is cooled, and a polyurethane foam is prepared according to the following formulation:

|  | Parts by wt. |
| --- | --- |
| Reaction product | 66 |
| Silicone surfactant | 0.5 |
| Armeen DMCD | 2.0 |
| Petrolether (BP below 50° C.) | 10.0 |
| Dibutyltin dimaleate | 0.05 |
| Polyphenyl polyisocyanate | 71.0 |

The cream time is 10 sec., rise time 25 sec. The resultant foam is tough and rigid.

EXAMPLE 9

Sardine oil (saponification value 191, iodine value 182) (470 grams) is reacted with diisopropanolamine (85 grams) at 185° C. for five hours.

After one hour, the reaction mixture remains clear when mixed with TDI.

Rigid polyurethane foams are prepared from samples withdrawn after 1 and 2 hours, respectively.

| Sample | Reaction time, hr. at 185° C. | OH eq. w. | Properties of resulting foam |
| --- | --- | --- | --- |
| A | 1 | 129 | Rigid tough foam with small cells (average 0.2 mm.), no shrinkage. |
| B | 2 | 135 | As A, but approximately 4% shrinkage. |

EXAMPLE 10

Peruvian fish oil, which has been polymerized to a viscosity of 5 poises (500 g.), and diethanolamine (114 grams) are reacted at 180° C. After 30 minutes, the reaction mixture becomes homogeneous. After 65 minutes, a sample will give a homogeneous reaction product with polyisocyanate.

Polyurethane foams are prepared from samples withdrawn after various times according to the following formulation:

| | G. |
|---|---|
| Reaction product | 67 |
| Silicone surfactant | 0.5 |
| Dibutyltin dimaleate | 0.1 |
| Freon 11 | 10 |
| MDI | 70 |

The results can be summarized as follows:

TABLE 1

Influence of reaction time upon foam quality

| Sample | Reaction time at 180° C. | Properties of resulting foam |
|---|---|---|
| A | 45 | Rigid tough foam with very small cells. No shrinkage at all. |
| B | 65 | Do. |

EXAMPLE 11

The experiment in Example 10 is repeated using refined safflower oil (150 parts) and diethanolamine (54.5 parts). After 70 minutes at 205° C., the mixture is cooled. The polyurethane foam prepared from the product of this reaction according to the recipe in Example 10 has the same properties as the foam in Example 10.

EXAMPLE 12

Soybean oil (saponification value 192, acid value 0.8, iodine value 135) (572 grams), EMPOL 1022 HM Dimer acid (acid value 186, saponification value 196, monobasic acid approximately 50%, dimer and trimer contents approximately 50%) (285 grams), and diethanolamine (580 grams) are heated to 160° C. for 3 hours, a vacuum being applied for the last hour to remove water. Water contents of the reaction mixture 0.5%.

A foam is prepared from the reaction mixture (32.5 parts), silicone surfactant (0.1 part), triethylene diamine (0.2 part), water (0.45 part), petrol ether (2.8 parts), and PAPI (43.0 parts).

The foam has a shrinkage of 2.6%. The aveage cell size is 30μ. Compressive strength is 3 kg./cm.² at 40 kg./m.³.

EXAMPLE 13

Polyol No. 2 of Example 1 is mixed with various amounts of a diethanol ammonium soap of tall oil fatty acid prepared by mixing equivalent amounts of tall oil fatty acid (acid value 195, rosin acids 4.2%) and diethanolamine. Foam is prepared using the following formulations:

| | 1 | 2 |
|---|---|---|
| Polyol No. 2 | 36 | 36 |
| Tall oil fatty acid | 28.7 | 14.4 |
| Diethanolamine | 10.5 | 5.25 |
| Silicone surfactant | 0.4 | 0.3 |
| Armeen DMCD | 0.6 | 0.55 |
| Petrol ether | 8.0 | 6.0 |
| PAPI | 95.5 | 66.0 |

NOTE.—The figures represent parts by weight.

Compressive strength of foam 2 is 1.0 kg./cm.². Foam 1 is rather brittle and disintegrates easily.

Preparation of foam 2 is repeated, this time with tall oil replaced by a branched fatty acid (modified fatty acid H 680 Unilever-Emery), with equal results.

EXAMPLE 14

Soybean oil (688 grams), diethanolamine (305 grams) (150% of the theoretical), and sodium methoxide (4 grams) are reacted at 160° C. After 3.5 hours, a sample gives a clear mixture with TDI. The mixture is cooled, and part of the excess diethanolamine is neutralized by adding 150 g. modified fatty acid H 680 from Unilever-Emery (acid value 186, saponification value approximately 197–203, iodine value 40–55). Polyurethane foam is prepared from a standard formulation using PAPI as polyisocyanate and petrol ether as blowing agent.

The foam has good dimensional stability.

EXAMPLE 15

Soybean oil (600 grams) and diethanolamine (224 grams) are reacted at 190° C. After one hour, a sample gives a clear mixture with TDI. Heating is continued for another 4 hours.

Samples withdrawn during the reaction have the following properities:

| | | Meq./g. | | | |
|---|---|---|---|---|---|
| Sample | Time at 190° C. | Amide | Amine | Ester | Free acid | OH eq. w. |
| A | 1 | 1.90 | 0.71 | 0.59 | 0.035 | 143 |
| B | 1.5 | 1.76 | 0.64 | 0.43 | 0.035 | 153 |
| C | 2.5 | 1.52 | 0.63 | 0.74 | 0.027 | 173 |
| D | 5 | 1.34 | 0.63 | 0.94 | 0.015 | 261 |

The OH equivalent weights of the samples are adjusted to 120 by adding sufficient glycerol. Foams are then prepared, using PAPI as polyisocyanate and Freon 11 as blowing agent. The following general properties are obtained. Foams "A," prepared from the adjusted sample A, are rigid with high compressive strength and have a shrinkage during moulding of 2 volume percent.

Foams "B" are rigid. The compressive strength is slightly lower, and the shrinkage is 4%.

Foams "C" are very tough. Shrinkage is 10%.

Foams "D" are soft, and shrinkage during moulding is approximately 35%, making the foam unsuitable for most purposes. The remainder of polyol sample D is reheated to 100° C. and kept at this temperature for 10 hours and then cooled. The hydroxyl equivalent weight is now 213, amide contents 1.38 meq./g. and ester contents 0.82 meq./g. The hydroxyl equivalent weight is adjusted to 120 and a foam is prepared. The foam is very tough, and shrinkage is approximately 12%.

EXAMPLE 16

Sample B of Example 15 (357 parts) is mixed with propylene glycol (46 parts). The resulting polyol component has an OH equivalent weight of 115 and an average functionality of 2.2. Foams prepared from this polyol with MDI (crude methylene bis(4-phenyl isocyanate)) as polyisocyanate component and petrol ether as blowing agent are rigid and tough with a compressive strength of 1.5 kg./cm.² at 38 kg./m.³.

We claim:

1. A rigid polyurethane obtained by the reaction of an organic polyisocyanate and a polyol component, the polyol component comprising a reaction product obtained by heating to a temperature of about 80° C. to about 200° C. one equivalent of a hydrocarbon fatty acid glyceride with 0.75 to 2.0 equivalents dialkanolamine, the heating being continued at least until the reaction product gives a clear mixture with toluene diisocyanate, at least about half of the said fatty acid being present in the said reaction product in the form of alkanolamide.

2. A polyurethane according to claim 1, in which the polyol component contains the reaction product of a naturally occurring fatty acid glyceride.

3. A polyurethane according to claim 1, in which the glyceride is a product consisting of a naturally occurring fatty acid glyceride together with free fatty acid.

4. A polyurethane according to claim 1, in which the dialkanolamine is diethanolamine.

5. A polyurethane according to claim 1 and further characterized in being in the form of a rigid foam.

References Cited

UNITED STATES PATENTS

| | | | |
|---|---|---|---|
| 2,833,730 | 5/1958 | Barthel | 260—2.5 |
| 2,955,091 | 10/1960 | Kane | 260—2.5 |
| 2,984,679 | 5/1961 | Ehrlich et al. | 260—404.5 |
| 3,345,311 | 10/1967 | Ehrlich et al. | 260—18 |
| 3,345,388 | 10/1967 | Milligan et al. | 260—404.5 |

FOREIGN PATENTS

| | | | |
|---|---|---|---|
| 563,893 | 9/1958 | Canada | 260—2.5 |
| 686,670 | 5/1964 | Canada | 260—2.5 |

DONALD E. CZAJA, Primary Examiner

E. C. RZUCIDLO, Assistant Examiner

U.S. Cl. X.R.

260—18 T N